(12) United States Patent
Kim et al.

(10) Patent No.: US 11,826,750 B2
(45) Date of Patent: Nov. 28, 2023

(54) DEHYDROGENATION REACTION APPARATUS

(71) Applicants: HYUNDAI MOTOR COMPANY, Seoul (KR); KIA CORPORATION, Seoul (KR); KOREA INSTITUTE OF SCIENCE AND TECHNOLOGY, Seoul (KR)

(72) Inventors: Yongwoo Kim, Gunpo-si (KR); Jin Woo Choung, Suwon-si (KR); Jihui Seo, Ulsan (KR); Jaeyong Lee, Seongnam-si (KR); Pyung Soon Kim, Suwon-si (KR); Yoondo Kim, Seoul (KR); Yu-Jin Lee, Seoul (KR); Jaewon Kirk, Seoul (KR); Suk Woo Nam, Seoul (KR); Hyuntae Sohn, Seoul (KR); Yongmin Kim, Seoul (KR); Hyangsoo Jeong, Seoul (KR)

(73) Assignees: HYUNDAI MOTOR COMPANY, Seoul (KR); KIA CORPORATION, Seoul (KR); KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 0 days.

(21) Appl. No.: 17/872,877

(22) Filed: Jul. 25, 2022

(65) Prior Publication Data
US 2023/0182099 A1 Jun. 15, 2023

(30) Foreign Application Priority Data
Dec. 13, 2021 (KR) .................. 10-2021-0177573

(51) Int. Cl.
*B01J 7/00* (2006.01)
*B01J 19/24* (2006.01)

(52) U.S. Cl.
CPC ............... *B01J 7/00* (2013.01); *B01J 19/245* (2013.01); *B01J 2219/24* (2013.01)

(58) Field of Classification Search
CPC ..... B01J 7/00; B01J 19/00; B01J 19/24; B01J 19/245; B01J 2219/00; B01J 2219/24
See application file for complete search history.

(56) References Cited

U.S. PATENT DOCUMENTS 8,758,722 B2 * 6/2014 Okada .................. C01B 3/0015
423/650

FOREIGN PATENT DOCUMENTS

WO WO-2021200665 A1 * 10/2021 ............. C01B 3/065

OTHER PUBLICATIONS

Machine translation of WO 2021/200655A1, published Oct. 7, 2021. (Year: 2021).*

* cited by examiner

*Primary Examiner* — Natasha E Young
(74) *Attorney, Agent, or Firm* — LEMPIA SUMMERFIELD KATZ LLC

(57) ABSTRACT

A dehydrogenation reaction apparatus includes a dehydrogenation reactor having a reaction vessel that stores a chemical hydride; and a methane generator that converts carbon monoxide generated in the dehydrogenation reactor into methane.

19 Claims, 6 Drawing Sheets

DEHYDROGENATION REACTION APPARATUS

CROSS-REFERENCE TO RELATED APPLICATION

This application claims priority to and the benefit of Korean Patent Application No. 10-2021-0177573 filed in the Korean Intellectual Property Office on Dec. 13, 2021, the entire contents of which are incorporated herein by reference.

BACKGROUND (a) Technical Field

The present disclosure relates to a dehydrogenation reaction apparatus. More particularly, the present disclosure relates to a dehydrogenation reaction apparatus that may remove carbon monoxide generated in a dehydrogenation reaction process.

(b) Description of the Related Art

Due to depletion of fossil energy and environmental pollution problems, there is a great demand for renewable and alternative energy, and hydrogen is attracting attention as one of such alternative energies.

A fuel cell and a hydrogen combustion device use hydrogen as a reaction gas, and in order to apply the fuel cell and the hydrogen combustion device to vehicles and various electronic products, a stable and continuous supply technology of hydrogen is required.

In order to supply hydrogen to a device that uses hydrogen, a method of being supplied with hydrogen whenever hydrogen is needed from a separately installed hydrogen supply source may be used. In this way, compressed hydrogen or liquefied hydrogen may be used.

Conventionally, in order to supply hydrogen to a fuel cell or a hydrogen combustion device, an acid aqueous solution is injected into a hydride stored in a reaction vessel to generate hydrogen, and in this case, carbon monoxide is generated during reaction between the hydride and the acid aqueous solution.

When hydrogen and carbon monoxide generated in the reaction vessel are supplied to the fuel cell, serious deactivation may occur in the fuel cell.

The above information disclosed in this Background section is only for enhancement of understanding of the background, and therefore it may contain information that does not form the prior art that is already known in this country to a person of ordinary skill in the art.

SUMMARY

The present disclosure has been made in an effort to provide a dehydrogenation reaction apparatus that may remove carbon monoxide generated during reaction between a hydride and an acid aqueous solution.

An embodiment of the present disclosure provides a dehydrogenation reaction apparatus including: a dehydrogenation reactor including a reaction vessel configured to store a chemical hydride; and a methane generator configured to convert carbon monoxide generated in the dehydrogenation reactor into methane.

The dehydrogenation reactor may include: a first supply port configured to supply an acid aqueous solution to the inside of the reaction vessel; a second supply port configured to supply a chemical hydride to the inside of the reaction vessel; and an outlet configured to discharge gas generated inside the reaction vessel.

The methane generator may include: a gas conduit that communicates with the outlet; and a catalyst provided inside the gas conduit.

The gas conduit may be installed to be in contact with the reaction vessel.

The catalyst may include at least one of nickel (Ni), ruthenium (Ru), cobalt (Co), rhodium (Rh), or iron (Fe).

The dehydrogenation reaction apparatus may further include a burner provided to surround the outside of the conduit.

The burner may be a hydrogen burner.

The methane generator may include: a partition wall disposed at an upper portion of the gas outlet in the inside of the reaction vessel; an upper plate disposed at an upper portion of the inside of the reaction vessel; and a catalyst respectively provided between the partition wall and a side surface of the reaction vessel and between the upper plate and an inner upper surface of the reaction vessel.

The upper plate may be formed in a form of a perforated plate or a mesh.

The catalyst may include at least one of nickel (Ni), ruthenium (Ru), cobalt (Co), rhodium (Rh), or iron (Fe).

The dehydrogenation reaction apparatus may further include a burner provided to surround the outside of the reaction vessel.

The burner may be a hydrogen burner. The methane generator may include: a catalyst housing fluidly connected to the gas outlet inside the reaction vessel; and a catalyst provided inside the catalyst housing.

The catalyst may include at least one of nickel (Ni), ruthenium (Ru), cobalt (Co), rhodium (Rh), or iron (Fe).

The dehydrogenation reaction apparatus may further include a burner provided to surround the catalyst housing.

The dehydrogenation reaction apparatus may further include a hydrogen buffer tank configured to temporarily store hydrogen generated in the dehydrogenation reactor and supply the hydrogen to a fuel cell.

The dehydrogenation reaction apparatus may further include a cooling coil installed inside the reaction vessel and configured to circulate a refrigerant.

The dehydrogenation reaction apparatus may further include: a back pressure regulator disposed between the dehydrogenation reactor and the hydrogen buffer tank; and a mass flow controller disposed between the hydrogen buffer tank and a fuel cell.

The dehydrogenation reaction apparatus may further include: an acid aqueous solution tank configured to store an acid aqueous solution; and a pump configured to pump an acid aqueous solution stored in the acid aqueous solution tank to the dehydrogenation reactor.

According to the dehydrogenation reaction apparatus according to the embodiment as described above, by converting carbon monoxide generated in a reaction process of a hydride and an acid aqueous solution into methane through a methane generator, poisoning of a fuel cell by the carbon monoxide may be prevented.

BRIEF DESCRIPTION OF THE DRAWINGS

These drawings are for reference only in describing embodiments, and therefore, the technical idea of the present disclosure should not be limited to the accompanying drawings.

DETAILED DESCRIPTION OF THE EMBODIMENTS

Figure 1:
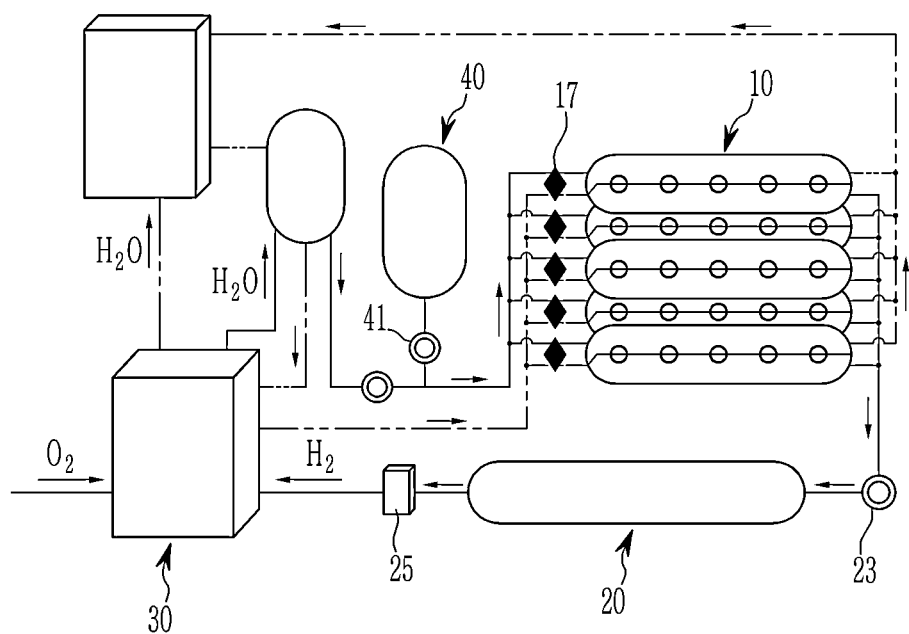
FIG. 1 illustrates a schematic view of a dehydrogenation reaction apparatus according to an embodiment.

The present disclosure is described with reference to the accompanying drawings, in which embodiments of the disclosure are shown. As those having ordinary skill in the art would realize, the described embodiments may be modified in various different ways, all without departing from the spirit or scope of the present disclosure.

In order to clearly describe the present disclosure, parts that are irrelevant to the description are omitted, and identical or similar constituent elements throughout the specification are denoted by the same reference numerals.

In addition, since the size and thickness of each configuration shown in the drawings are arbitrarily shown for convenience of description, the present disclosure is not necessarily limited to configurations illustrated in the drawings, and in order to clearly illustrate several parts and areas, enlarged thicknesses are shown.

Hereinafter, a dehydrogenation reaction apparatus according to an embodiment is described in detail with reference to the accompanying drawings.

FIG. 1 illustrates a schematic view of a dehydrogenation reaction apparatus according to an embodiment.

As shown in FIG. 1, a dehydrogenation reaction apparatus 1 (see FIG. 2) according to an embodiment may include a dehydrogenation reactor 10 for generating hydrogen by reaction of a chemical hydride with an acid aqueous solution, a hydrogen buffer tank 20 for temporarily storing the hydrogen generated in the dehydrogenation reactor 10, an acid aqueous solution tank 40 for storing the acid aqueous solution supplied to the dehydrogenation reactor 10, and methane generators 50 (see FIG. 2), 60 (see FIGS. 5), and 70 (see FIG. 6) for converting carbon monoxide generated as a by-product by the reaction of the chemical hydride with the acid aqueous solution into methane.

The dehydrogenation reactor 10 may be configured as a high-temperature and high-pressure vessel so that the dehydrogenation reaction may be performed under a high-temperature and high-pressure condition. For example, the dehydrogenation reactor 10 may have a cylindrical, spherical, rectangular parallelepiped, or polygonal prism shape. In one particular example, the dehydrogenation reactor 10 may have a cylindrical shape.

Figure 2:
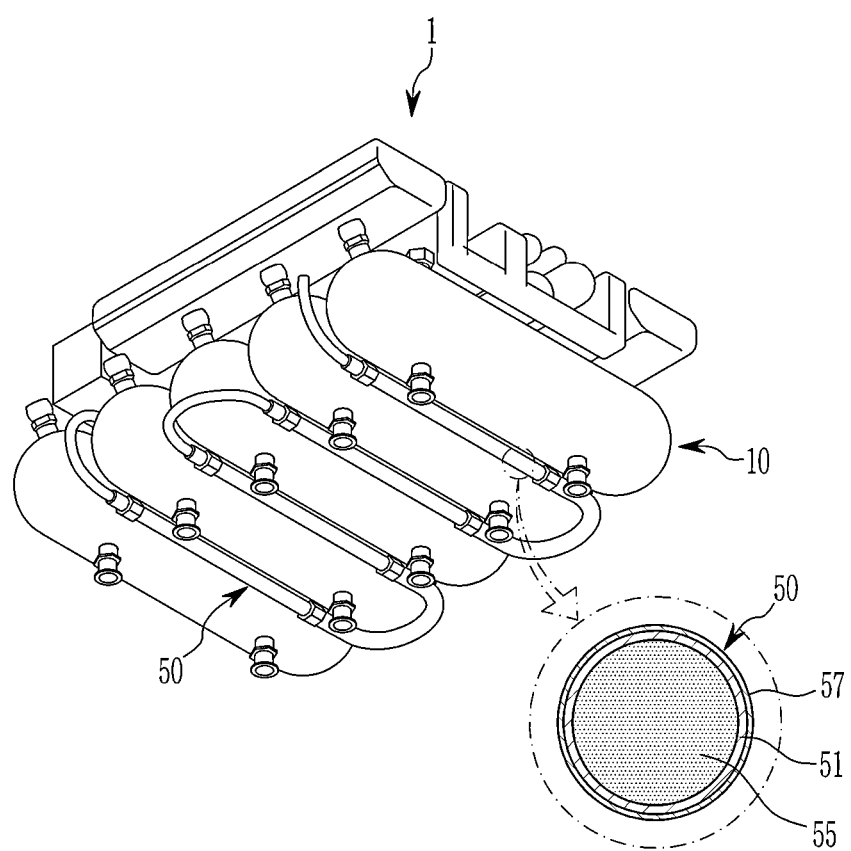
FIG. 2 illustrates a perspective view of a dehydrogenation reaction apparatus according to an embodiment.
Figure 3:
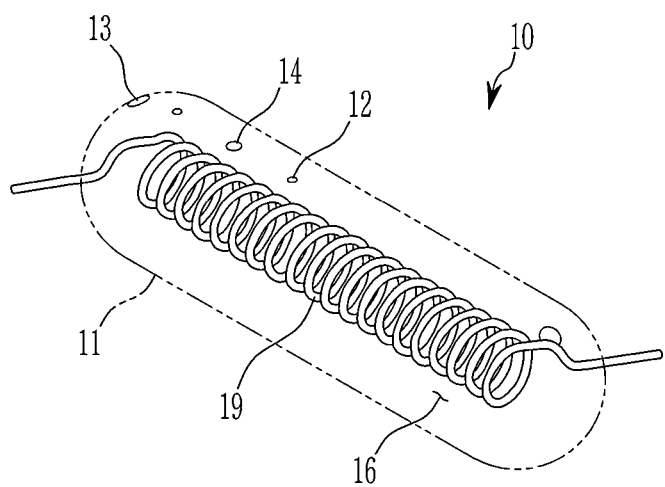
FIG. 3 illustrates a perspective view of a dehydrogenation reactor according to an embodiment.

Referring to FIG. 2 and FIG. 3, the dehydrogenation reactor 10 includes a reaction vessel 11 which is initially empty inside so as to store a chemical hydride. The reaction vessel 11 is formed with a first supply port 12 for supplying an acid aqueous solution to an inner space of the reaction vessel 11, a second supply port 13 for supplying a chemical hydride to the inner space of the reaction vessel 11, and a gas outlet 14 through which hydrogen and carbon monoxide generated by the dehydration reaction in the inner space of the reaction vessel are discharged.

In an embodiment, the inner space of the reaction vessel 11 is referred to as a reaction space 16 in which the hydride and the acid aqueous solution react as necessary.

The first supply port 12 and the acid aqueous solution tank 40 are fluidly connected so as to supply an acid aqueous solution to the inner space through the first supply port 12.

The chemical hydride supplied through the second supply port 13 may be supplied into the inner space of the reaction vessel 11 in a form of powder. For example, the chemical hydride may be filled in the form of powder in the inner space of the reaction vessel 11 at a gas station. The chemical hydride supplied to the inner space of the reaction vessel 11 is supplied by a predetermined amount through the second supply port 13, and for example, about 1 kg of hydride may be filled in the inner space of the reaction vessel 11.

The chemical hydride is in a solid state, and for example, may be in a form of one of powder, granular, beads, microcapsules, or pellets.

The chemical hydride may be a compound that is hydrolyzed to produce hydrogen and a hydrolyzate. In certain examples, the chemical hydride may include sodium borohydride ($NaBH_4$), lithium borohydride ($LiBH_4$), potassium borohydride ($KBH_4$), ammonium borohydride ($NH_4BH_4$), ammonia borane ($NH_3BH_3$), tetramethyl ammonium borohydride (($CH_3$)$_4NH_4BH_4$), sodium aluminum hydride ($NaAlH_4$), lithium aluminum hydride ($LiAlH_4$), potassium aluminum hydride ($KAlH_4$), calcium borohydride ($Ca(BH_4)_2$), magnesium borohydride ($Mg(BH_4)_2$), sodium tetrahydridogallate ($NaGaH_4$), lithium tetrahydridogallate ($LiGaH_4$), potassium tetrahydridogallate ($KGaH_4$), lithium hydride (LiH), calcium hydride ($CaH_2$), magnesium hydride ($MgH_2$), or a mixture thereof.

Since the hydrogen generation reaction (dehydrogenation reaction) inside the dehydrogenation reactor 10 is an exothermic reaction, a cooling coil 19 may be installed inside the reaction vessel 11 as needed to cool reaction heat. A refrigerant may be circulated in the cooling coil 19 to cool heat generated by hydrolysis of the chemical hydride.

The acid aqueous solution tank 40 stores the acid aqueous solution and supplies the stored acid aqueous solution to the dehydrogenation reactor 10. An injection valve 17 is provided between the acid aqueous solution tank 40 and the dehydrogenation reactor 10, and a flow rate of the acid aqueous solution supplied to the dehydrogenation reactor 10 may be determined by an opening amount of the injection valve 17. To this end, the acid aqueous solution tank 40 and the dehydrogenation reactor 10 are fluidly connected.

A pump 41 is provided between the acid aqueous solution tank 40 and the dehydrogenation reactor 10, and the acid aqueous solution stored in the acid aqueous solution tank 40 is configured to be pumped by the pump 41 and supplied to the dehydrogenation reactor 10.

The acid aqueous solution tank 40 may be formed with a corrosion-resistant protective film such as a Teflon™ coating in order to prevent corrosion by the acid aqueous solution. The acid aqueous solution adjusts a pH of the chemical hydride to shorten a half-life thereof, thereby promoting the dehydrogenation reaction.

The acid may be an inorganic acid such as a sulfuric acid, a nitric acid, a phosphoric acid, a boric acid, or a hydrochloric acid, an organic acid such as a heteropoly acid, an acetic acid, a formic acid, a malic acid, a citric acid, a tartaric acid, an ascorbic acid, a lactic acid, an oxalic acid, a succinic acid, or a tauric acid, or a mixture thereof. In certain examples, formic acid (HCOOH) may be used, as it may reduce system weight, and because it is safer than a hydrochloric acid in a high concentration state.

The formic acid, as a weak acid, may be relatively safely used by being maintained at a low pH under the conditions described in the present disclosure. In addition, since the captured carbon dioxide may be obtained through hydrogenation, it is an important material in terms of re-utilizing/recycling of carbon dioxide. In addition, formate is converted to bicarbonate through a dehydrogenation reaction, in which case hydrogen may be additionally obtained.

The buffer tank 20 is configured to temporarily store the hydrogen generated in the dehydrogenation reaction apparatus 1, and as necessary, the hydrogen stored in the hydrogen buffer tank 20 is configured to be supplied to a fuel cell 30. To this end, the hydrogen buffer tank 20 and the dehydrogenation reactor 10 are fluidly connected.

A back pressure regulator 23 is provided between the hydrogen buffer tank 20 and the dehydrogenation reactor 10. When an inner pressure of the dehydrogenation reactor 10 increases to a predetermined pressure or more, hydrogen is configured to be supplied to the hydrogen buffer tank 20.

The hydrogen temporarily stored in the hydrogen buffer tank 20 is configured to be supplied to the fuel cell 30. To this end, the hydrogen buffer tank 20 and the fuel cell 30 are fluidly connected. A mass flow controller (MFC) is disposed between the hydrogen buffer tank 20 and the fuel cell 30 to control the flow of the hydrogen supplied to the fuel cell 30.

The methane generator 50 is configured to convert carbon monoxide generated as a by-product into methane when hydrogen is generated by dehydrogenation reaction between the hydride and the acid aqueous solution in the inner space of the dehydrogenation reactor 10. The methane generator 50 may be disposed between the dehydrogenation reactor 10 and the buffer tank 20.

The methane generator 50 may include a gas conduit 51 fluidly connected to the gas outlet 14 of the dehydrogenation reactor 10, and a catalyst provided in the gas conduit 51. For example, the gas conduit 51 is installed to be in contact with the reaction vessel of the dehydrogenation reactor 10.

The catalyst 55 provided in the gas conduit 51 may include at least one of nickel (Ni), ruthenium (Ru), cobalt (Co), rhodium (Rh), or iron (Fe). The catalyst 55 is in a solid state, and for example, may be in a form of one of granular, beads, microcapsules, or pellets.

The catalyst 55 of this type is filled in the gas conduit 51, and as the hydrogen and carbon monoxide gases discharged from the dehydrogenation reactor 10 pass through the catalyst 55, carbon monoxide is converted into methane. Methanation of carbon monoxide occurs under a high temperature condition. For example, when a nickel catalyst is used, the methanation reaction is performed at 300 degrees Celsius or more, and most of carbon monoxide is converted into methane at 340 degrees Celsius. However, under a condition of a high hydrogen partial pressure and low carbon monoxide as in the present disclosure, conversion to methane is possible even at 200 degrees Celsius or less.

In the embodiment, carbon monoxide is methanated by using the heat generated in the dehydrogenation reaction, which is an exothermic reaction made inside the dehydrogenation reactor 10. In other words, the gas conduit 51 of the methane generator 50 is installed to be in contact with the reaction vessel 11 of the dehydrogenation reactor 10, so that the heat generated in the dehydrogenation reactor 10 is transmitted to the gas conduit 51, and the gas conduit 51 may be maintained at a high temperature state. Accordingly, since there is no need to provide a separate heat source for methanation of carbon monoxide, it is possible to reduce a manufacturing cost of the dehydrogenation reactor 10.

When it is necessary to separately heat the gas conduit 51 of the methane generator 50, a burner 57 may be installed to surround the gas conduit 51 of the methane generator 50. In this case, the burner 57 may be a hydrogen burner using the hydrogen generated in the dehydrogenation reactor 10.

Hereinafter, an operation of the dehydrogenation reaction apparatus 1 according to the embodiment as described above is described in detail.

At a gas station and the like, a set amount of chemical hydride is charged into the high temperature and high-pressure dehydrogenation reactor 10 through the second supply port 13. In this case, the chemical hydride is charged in the form of solid powder, granular, beads, microcapsules, or pellets.

When the pressure of the buffer tank 20 is lowered to below a set pressure, the acid aqueous solution is injected into the inner space of the dehydrogenation reactor 10 through the first supply port 12. In this case, the acid aqueous solution mixed at a specific molar ratio is injected by using the pump 41. In this case, an injection rate may vary depending on a size of the dehydrogenation reactor 10 and an amount of chemical hydride.

Hydrogen is generated by the dehydrogenation reaction between the chemical hydride charged into the reaction vessel 11 by the injection of the acid aqueous solution and the acid aqueous solution. In this case, in the inner space of the reaction vessel 11, a dehydrogenation reaction in which hydrogen is generated by a hydrolysis reaction of a chemical hydride by an acid aqueous solution proceeds. For example, the chemical hydride may be $NaBH_4$, and the acid may be HCOOH. In a case of a system using $NaBH_4$ and formic acid (HCOOH), a temperature of the dehydrogenation reaction may be in a range of 10° C. to 400° C. or 100° C. to 250° C.

On the other hand, when the dehydrogenation reaction is performed in the reaction vessel 11, carbon monoxide, which is a by-product, may be generated.

Hydrogen generated by the dehydrogenation reaction in the inner space of the reaction vessel 11 and carbon monoxide as a by-product are discharged to the methane generator 50 through the gas outlet 14. The carbon monoxide introduced into the gas conduit 51 by the catalyst 55 provided inside the methane generator 50 is converted into methane. The hydrogen and methane are supplied to the buffer tank 20, and the hydrogen temporarily stored in the buffer tank 20 is supplied to the fuel cell 30.

In this case, since the gas conduit 51 of the methane generator 50 is installed so as to be in contact with the reaction vessel 11 of a high temperature, it is not necessary to separately heat the methane generator 50, thereby reducing the manufacturing cost of the dehydrogenation reaction apparatus 1. As necessary, the gas conduit 51 of the methane generator 50 may be heated by the burner 57.

Hereinafter, a dehydrogenation reaction apparatus according to another embodiment is described in detail with reference to the accompanying drawings.

Figure 4:
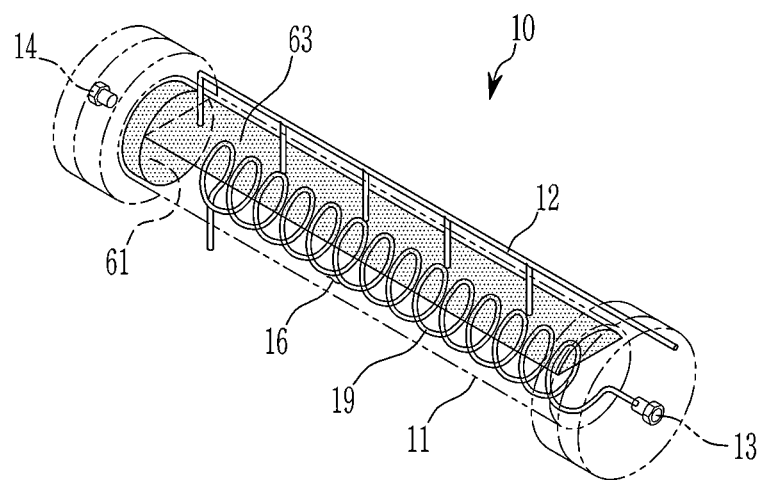
FIG. 4 illustrates a perspective view of a dehydrogenation reactor according to another embodiment.
Figure 5:
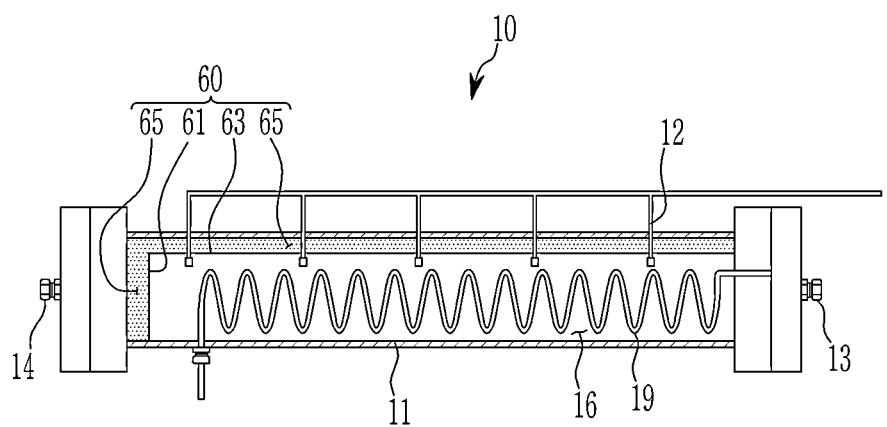
FIG. 5 illustrates a cross-sectional view of a dehydrogenation reactor according to another embodiment.

FIG. 4 illustrates a perspective view of a dehydrogenation reactor according to another embodiment. FIG. 5 illustrates a cross-sectional view of a dehydrogenation reactor according to another embodiment.

The methane generator 60 of the dehydrogenation reaction apparatus 1 described above is configured to be installed outside the dehydrogenation reactor 10, but there is a difference in that the methane generator 60 of the dehydrogenation reaction apparatus 1 according to another embodiment is installed inside the dehydrogenation reactor 10.

Hereinafter, only the parts that are different from the dehydrogenation reaction apparatus 1 described above are explained.

Referring to FIG. 4 and FIG. 5, the dehydrogenation reactor 10 includes the reaction vessel 11, which is initially empty inside so as to store a chemical hydride. The reaction vessel 11 is formed with the first supply port 12 for supplying an acid aqueous solution to an inner space of the reaction vessel 11, the second supply port 13 for supplying a chemical hydride to the inner space of the reaction vessel 11, and the gas outlet 14 through which hydrogen and carbon monoxide generated by the dehydration reaction in the inner space of the reaction vessel are discharged.

The methane generator 60 according to another embodiment may include a partition wall 61 disposed inside the reaction vessel 11, an upper plate 63 disposed inside the reaction vessel 11, and a catalyst 65 respectively provided between the partition wall 61 and an inner surface of the reaction vessel 11 and between the upper plate 63 and the inner surface of the reaction vessel 11.

In other words, inside the reaction vessel 11 of the dehydrogenation reactor 10, the partition wall 61 is disposed upstream of the gas outlet 14, and the upper plate 63 is disposed at an inner upper portion of the reaction vessel 11 of the dehydrogenation reactor 10. A space is formed between the partition wall 61 and an inner side surface of the reaction vessel 11, and between the upper plate 63 and the inner upper surface of the reaction vessel 11, respectively. The catalyst 65 is provided between the partition wall 61 and the side surface of the reaction vessel 11, and between the upper plate 63 and the inner side surface of the reaction vessel 11, respectively.

In another embodiment, the first supply port 12 is formed on the upper portion of the reaction vessel 11, the second supply port 13 is formed on one surface of the reaction vessel 11, and the gas outlet 14 is formed on the other surface of the reaction vessel 11. The first supply port 12 may extend into the inner space of the reaction vessel 11 through the upper plate 63. Accordingly, the acid aqueous solution supplied through the first supply port 12 may be supplied to the inner space of the reaction vessel 11.

By the partition wall 61, the reactant (hydride+acid aqueous solution) provided in the inside of the reaction vessel 11 may be prevented from flowing out of the reaction vessel 11 through the gas outlet 14.

The upper plate 63 may be formed in the form of a perforated plate or a mesh. As described above, since the catalyst 65 is in a solid state such as granular, beads, microcapsules, or pellets, the reaction space 16 and the space in which the catalyst 65 is disposed are separated inside the reaction vessel 11 by the upper plate 63.

In addition, the reactant is prevented from flowing into the catalyst 65 by the upper plate 63 in the form of a perforated plate or a mesh.

In addition, since the catalyst 65 is formed in the form of granular, beads, microcapsules, or pellets, hydrogen generated in the reaction space 16 may smoothly flow to the gas outlet 14.

In another embodiment, carbon monoxide is methanated by using the heat generated in the dehydrogenation reaction, which is an exothermic reaction made inside the dehydrogenation reactor 10. In other words, since the catalyst 65 of the methane generator 60 is provided in the reaction vessel 11, the heat generated inside the dehydrogenation reactor 10 is transmitted to the catalyst 65, so that the catalyst 65 may be maintained at a high temperature state. Accordingly, since there is no need to provide a separate heat source for methanation of carbon monoxide, it is possible to reduce a manufacturing cost of the dehydrogenation reactor 10.

When it is necessary to separately heat the catalyst 65 of the methane generator 60, a burner 57 may be installed to surround a portion of an outer side of the reaction vessel 11 (for example, the upper portion of the reaction vessel 11 provided with the upper plate 63). In this case, the burner 57 may be a hydrogen burner using the hydrogen generated in the dehydrogenation reactor 10.

Hereinafter, an operation of the dehydrogenation reaction apparatus 1 according to another embodiment as described above is described in detail below.

At a gas station and the like, a set amount of chemical hydride is charged into the high temperature and high-pressure dehydrogenation reactor 10 through the second supply port 13. In this case, the chemical hydride is charged in the form of solid powder, granular, beads, microcapsules, or pellets.

When the pressure of the buffer tank 20 is lowered to below a set pressure, the acid aqueous solution is injected into the inner space of the dehydrogenation reactor 10 through the first supply port 12. In this case, the acid aqueous solution mixed at a specific molar ratio is injected by using the pump 41. In this case, the injection rate thereof may be adjusted to 0.01 mL/min to 20 mL/min and may vary depending on the size of the dehydrogenation reactor 10 and the amount of chemical hydride.

Hydrogen is generated by the dehydrogenation reaction between the chemical hydride charged into the reaction vessel 11 by the injection of the acid aqueous solution and the acid aqueous solution. In this case, in the inner space of the reaction vessel 11, a dehydrogenation reaction in which hydrogen is generated by a hydrolysis reaction of a chemical hydride by an acid aqueous solution proceeds. For example, the chemical hydride may be $NaBH_4$, and the acid may be $HCOOH$. In a case of a system using $NaBH_4$ and formic acid ($HCOOH$), a temperature of the dehydrogenation reaction may be in a range of 10° C. to 400° C. or 100° C. to 250° C.

On the other hand, when the dehydrogenation reaction is performed in the reaction vessel 11, carbon monoxide, which is a by-product, may be generated.

Hydrogen generated by the dehydrogenation reaction in the inner space of the reaction vessel 11 and carbon monoxide as a by-product flow into catalysts 65, and 75 through the upper plate 63 formed in the form of a perforated plate or a mesh. The carbon monoxide flowing into the catalysts 55, 65, and 75 is converted into methane in the high-temperature reaction vessel 11, and the hydrogen and methane are supplied to the buffer tank 20 through the gas outlet 14, and the hydrogen temporarily stored in the buffer tank 20 is supplied to the fuel cell 30.

In this case, since the catalyst 65 is provided inside the reaction vessel of the dehydrogenation reactor 10, there is no need to separately heat the catalyst Accordingly, it is possible to reduce the manufacturing cost of the dehydrogenation reaction apparatus 1. As necessary, the reaction vessel 11 of the dehydrogenation reactor 10 may be heated by the burner 57.

In addition, since an upper portion of the gas outlet 14 is blocked by the partition wall 61, the reactant inside the reaction vessel 11 is prevented from being discharged to the gas outlet 14.

Finally, the dehydrogenation reaction apparatus 1 according to another embodiment is described in detail below with reference to the accompanying drawings.

Figure 6:
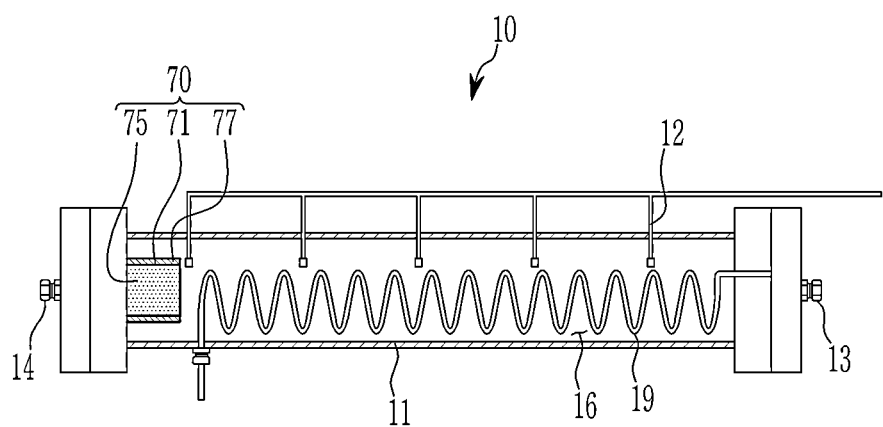
FIG. 6 illustrates a cross-sectional view of a dehydrogenation reactor according to another embodiment.

FIG. 6 illustrates a cross-sectional view of a dehydrogenation reactor according to another embodiment.

The methane generator 50 of the dehydrogenation reaction apparatus 1 described above is installed outside the dehydrogenation reactor 10. However, there is a difference in that the methane generator 70 of the dehydrogenation reaction apparatus 1 according to another embodiment is installed inside the dehydrogenation reactor 10. Hereinafter, only the parts that are different from the dehydrogenation reaction apparatus 1 described above are explained.

Referring to FIG. 6, the dehydrogenation reactor 10 includes the reaction vessel 11, which is empty inside so as to store a chemical hydride. The reaction vessel 11 is formed with the first supply port 12 for supplying an acid aqueous solution to an inner space of the reaction vessel 11, the second supply port 13 for supplying a chemical hydride to the inner space of the reaction vessel 11, and the gas outlet 14 through which hydrogen and carbon monoxide generated by the dehydration reaction in the inner space of the reaction vessel are discharged.

The methane generator 70 according to another embodiment may include a catalyst housing 71 fluidly connected to the gas outlet 14 inside the reaction vessel 11, and a catalyst 75 provided inside the catalyst housing 71.

In other words, the catalyst housing 71 is disposed inside the reaction vessel 11, and the catalyst 75 is filled in the catalyst housing 71. The catalyst housing 71 is fluidly connected to the reaction space 16 of the reaction vessel 11 and is fluidly connected to the gas outlet 14. Accordingly, the hydrogen and carbon monoxide generated in the reaction space 16 of the reaction vessel 11 are discharged to the gas outlet 14 through the catalyst housing 71. In this case, the carbon monoxide is converted into methane while passing through the catalyst 75 provided in the inside of the catalyst housing 71.

In another embodiment, carbon monoxide is methanated by using the heat generated in the dehydrogenation reaction, which is an exothermic reaction made inside the dehydrogenation reactor 10. In other words, since the catalyst 75 of the methane generator 70 is provided in the reaction vessel 11, the heat generated inside the dehydrogenation reactor 10 is transmitted to the catalyst 75, so that the catalyst 75 may be maintained at a high temperature state. Accordingly, since there is no need to provide a separate heat source for methanation of carbon monoxide, it is possible to reduce a manufacturing cost of the dehydrogenation reactor 10.

When it is necessary to separately heat the catalyst 75 of the methane generator 70, a burner 77 may be installed to surround the outside of the catalyst housing 71. In this case, the burner 77 may be a hydrogen burner using the hydrogen generated in the dehydrogenation reactor 10.

Hereinafter, an operation of the dehydrogenation reaction apparatus 1 according to another embodiment as described above is described in detail below.

At a gas station and the like, a set amount of chemical hydride is charged into the high temperature and high-pressure dehydrogenation reactor 10 through the second supply port 13. In this case, the chemical hydride is charged in the form of solid powder, granular, beads, microcapsules, or pellets.

When the pressure of the buffer tank 20 is lowered to below a set pressure, the acid aqueous solution is injected into the inner space of the dehydrogenation reactor 10 through the first supply port 12. In this case, the acid aqueous solution mixed at a specific molar ratio is injected by using the pump 41. In this case, the injection rate thereof may be adjusted to 0.01 mL/min to 20 mL/min and may vary depending on the size of the dehydrogenation reactor 10 and the amount of chemical hydride.

Hydrogen is generated by the dehydrogenation reaction between the chemical hydride charged into the reaction vessel 11 by the injection of the acid aqueous solution and the acid aqueous solution. In this case, in the inner space of the reaction vessel 11, a dehydrogenation reaction in which hydrogen is generated by a hydrolysis reaction of a chemical hydride by an acid aqueous solution proceeds. For example, the chemical hydride may be $NaBH_4$, and the acid may be $HCOOH$. In a case of a system using $NaBH_4$ and formic acid ($HCOOH$), a temperature of the dehydrogenation reaction may be in a range of 10° C. to 400° C. or 100° C. to 250° C.

On the other hand, when the dehydrogenation reaction is performed in the reaction vessel 11, carbon monoxide, which is a by-product, may be generated.

Hydrogen generated by the dehydrogenation reaction in the inner space of the reaction vessel 11 and carbon monoxide as a by-product flow into the catalyst housing 71, and the carbon monoxide flowing into the catalyst housing 71 is converted into methane by the catalyst 75 provided in the catalyst housing 71. The hydrogen and methane are supplied to the buffer tank 20 through the gas outlet 14, and the hydrogen temporarily stored in the buffer tank 20 is supplied to the fuel cell 30.

In this case, since the catalyst housing 71 provided with the catalyst 75 is provided inside the reaction vessel, there is no need to separately heat the catalyst 75. Accordingly, it is possible to reduce the manufacturing cost of the dehydrogenation reaction apparatus 1. As necessary, the catalyst housing 71 may be heated by the burner 77.

According to the dehydrogenation reaction apparatus 1 according to the embodiment as described above, since carbon monoxide, which is a by-product generated by a reaction of a chemical hydride and an acid aqueous solution, is converted into methane by the methane generators 50, 60, and 70 to be supplied to the fuel cell 30, poisoning of the fuel cell 30 may be prevented.

In addition, since carbon monoxide is methanated by using the heat generated in the dehydrogenation reactor, there is no need to introduce a separate heat source, and the manufacturing cost of the dehydrogenation reaction device 1 may be reduced.

While this disclosure has been described in connection with what is presently considered to be practical embodiments, it is to be understood that the disclosure is not limited to the disclosed embodiments, but, on the contrary, is intended to cover various modifications and equivalent arrangements included within the spirit and scope of the appended claims.

<Description of symbols>
1: dehydrogenation reaction apparatus
dehydrogenation reactor
11: reaction vessel
12: first supply port
13: second supply port
14: gas outlet
16: reaction space
17: injection valve
19: cooling coil
20: buffer tank
23: back pressure regulator
30: fuel cell
40: acid aqueous solution tank
41: pump
50 60, 70: methane generator 51: gas conduit
55, 65, 75: catalyst
57, 77: burner
61: partition wall
63: upper plate
71: catalyst housing

What is claimed is:

1. A dehydrogenation reaction apparatus comprising:
   a dehydrogenation reactor including a reaction vessel configured to store a chemical hydride; and
   a methane generator configured to convert carbon monoxide generated in the dehydrogenation reactor into methane.

2. The dehydrogenation reaction apparatus of claim 1, wherein the dehydrogenation reactor further comprises:
   a first supply port configured to supply an acid aqueous solution to an inside of the reaction vessel;
   a second supply port configured to supply a chemical hydride to the inside of the reaction vessel; and
   an outlet configured to discharge gas generated inside the reaction vessel.

3. The dehydrogenation reaction apparatus of claim 2, wherein the methane generator comprises:
   a gas conduit that communicates with the outlet; and
   a catalyst provided inside the gas conduit.

4. The dehydrogenation reaction apparatus of claim 3, wherein the gas conduit is installed to be in contact with the reaction vessel.

5. The dehydrogenation reaction apparatus of claim 3, wherein the catalyst comprises nickel (Ni), ruthenium (Ru), cobalt (Co), rhodium (Rh), iron (Fe), or a combination thereof.

6. The dehydrogenation reaction apparatus of claim 3, further comprising:
   a burner provided to surround an outside of the gas conduit.

7. The dehydrogenation reaction apparatus of claim 6, wherein the burner is a hydrogen burner.

8. The dehydrogenation reaction apparatus of claim 2, wherein the methane generator comprises:
   a partition wall disposed at an upper portion of the outlet in the inside of the reaction vessel;
   an upper plate disposed at an upper portion of the inside of the reaction vessel; and
   a catalyst provided between the partition wall and a side surface of the reaction vessel and between the upper plate and an inner upper surface of the reaction vessel.

9. The dehydrogenation reaction apparatus of claim 8, wherein the upper plate is a perforated plate or a mesh.

10. The dehydrogenation reaction apparatus of claim 8, wherein the catalyst comprises nickel (Ni), ruthenium (Ru), cobalt (Co), rhodium (Rh), iron (Fe), or a combination thereof.

11. The dehydrogenation reaction apparatus of claim 8, further comprising:
    a burner provided to surround an outside of the reaction vessel.

12. The dehydrogenation reaction apparatus of claim 11, wherein the burner is a hydrogen burner.

13. The dehydrogenation reaction apparatus of claim 3, wherein the methane generator comprises:
    a catalyst housing fluidly connected to the outlet inside the reaction vessel; and
    a catalyst provided inside the catalyst housing.

14. The dehydrogenation reaction apparatus of claim 13, wherein the catalyst comprises nickel (Ni), ruthenium (Ru), cobalt (Co), rhodium (Rh), and iron (Fe), or a combination thereof.

15. The dehydrogenation reaction apparatus of claim 13, further comprising:
    a burner provided to surround the catalyst housing.

16. The dehydrogenation reaction apparatus of claim 1, further comprising:
    a hydrogen buffer tank configured to temporarily store hydrogen generated in the dehydrogenation reactor and supply the hydrogen to a fuel cell.

17. The dehydrogenation reaction apparatus of claim 1, further comprising:
    a cooling coil installed inside the reaction vessel and configured to circulate a refrigerant.

18. The dehydrogenation reaction apparatus of claim 1, further comprising:
    a back pressure regulator disposed between the dehydrogenation reactor and a hydrogen buffer tank; and
    a mass flow controller disposed between the hydrogen buffer tank and a fuel cell.

19. The dehydrogenation reaction apparatus of claim 1, further comprising:
    an acid aqueous solution tank configured to store an acid aqueous solution; and
    a pump configured to pump an acid aqueous solution stored in the acid aqueous solution tank to the dehydrogenation reactor.

* * * * *